United States Patent [19]

Bettcher

[11] 4,178,683

[45] Dec. 18, 1979

[54] KNIFE WITH REMOVABLE BLADE

[75] Inventor: Louis A. Bettcher, Amherst, Ohio

[73] Assignee: Bettcher Industries, Inc., Birmingham, Ohio

[21] Appl. No.: 960,966

[22] Filed: Nov. 15, 1978

Related U.S. Application Data

[63] Continuation-in-part of Ser. No. 924,914, Jul. 17, 1978.

[51] Int. Cl.[2] .......................... A22C 17/04; A22C 17/12

[52] U.S. Cl. .......................................................... 30/276

[58] Field of Search .................. 30/276, 286, 316, 347, 30/240; 24/256

[56] References Cited

U.S. PATENT DOCUMENTS

| | | | |
|---|---|---|---|
| 759,045 | 5/1904 | Tracy | 24/256 |
| 2,147,963 | 2/1939 | Casciotti | 24/256 |
| 2,981,507 | 4/1961 | Dawson | 24/256 |
| 3,269,010 | 8/1966 | Bettcher | 30/276 |

*Primary Examiner*—Jimmy C. Peters

*Attorney, Agent, or Firm*—Watts, Hoffmann, Fisher & Heinke Co.

[57] ABSTRACT

A hand knife having a ring-like rotary blade the diameter of which is considerably greater than its axial length rotated by a motor in a handle extending normal to the axis of rotation of the blade. The blade of the knife is rotatably supported in a blade housing that surrounds it and which can be removed together with the blade for sharpening of the blade by merely loosening a pair of threaded fasteners. The knife also has a member in the interior of the blade which guides a part being removed from a product being processed through the central opening of the blade and interferes or restricts the movement of the part with the circular rotation of the blade thereby increasing the efficiency of the cutting operation. The material guiding and restricting member is connected to the knife by the same fasteners which connect the knife housing to the knife handle, may be angularly adjusted within the blade and/or may also be disassembled from the knife without removing the fasteners.

6 Claims, 8 Drawing Figures

KNIFE WITH REMOVABLE BLADE

CROSS-REFERENCE TO RELATED CASES

This application is a continuation-in-part of co-pending application Ser. No. 924,914 filed July 17, 1978, entitled BONING KNIFE.

BACKGROUND OF THE INVENTION

1. Field of the Invention

The invention relates to hand knives having power driven ring-like rotary cutting blades used primarily in the packing house, and meat distribution industries, for trimming and slicing meat and for removing meat from bones.

2. Description of the Prior Art

Hand knives having power driven, ring-like rotary blades have been used for some time in packing houses, meat distribution or wholesale houses and the like, for trimming and slicing meat and for removing meat particles from bones. These knives are commonly referred to as trimming and slicing knives and boning knives. Two such prior art knives are discloses in U.S. Pat. No. 3,852,882. The ring-like blades of such knives are of relatively small diameter and dull after relatively short usage and are difficult to sharpen. While sharpeners are available for sharpening such knives without removing the blade from the knife, the blades are generally removed from the knives for sharpening. Because of the relatively small sizes of the parts involved, removal and replacement of the blades has been a tedious and time consuming operation. This is especially true as the operation is performed at the locations where the knives are used, that is, in packing houses and the like, and the parts are typically wet and greasy. Material being removed from a product being processed has a tendency to fall away from the product and to follow the circular motion of the knife thus reducing the efficiency of the cutting or triming operation.

SUMMARY OF THE INVENTION

The invention provides a novel and improved hand knife of the character referred to having a power driven ring-like blade rotatably supported in a housing with the cutting edge of the blade projecting from one end of the housing which housing is detachably connected to the handle assembly by headed and threaded fasteners, which knife is light in weight and readily manipulated by an operator, and from which the blade can be readily removed and replaced with minimum inconvenience and delay.

The invention also provides a knife of the character referred to with a member within the blade for restricting movement of a part of a product being removed by the knife from following the rotation of the blade and assisting in guiding its exit through the blade thus enhancing the cutting operation.

The object of this invention heretofore mentioned are accomplished by providing the knife with a ring-like product guiding and restricting member within the blade and detachably connecting the blade housing and the product guiding and restricting member to the handle assembly by threaded fasteners extending through slots in the blade housing and the product guiding and restricting member which slots open into the ends of one or both members remote from the cutting edge of the knife.

Further objects and advantages of the invention will be hereinafter referred to and/or be apparent from the following description of the preferred embodiment of the invention.

DESCRIPTION OF THE PREFERRED EMBODIMENTS

Figure 1:
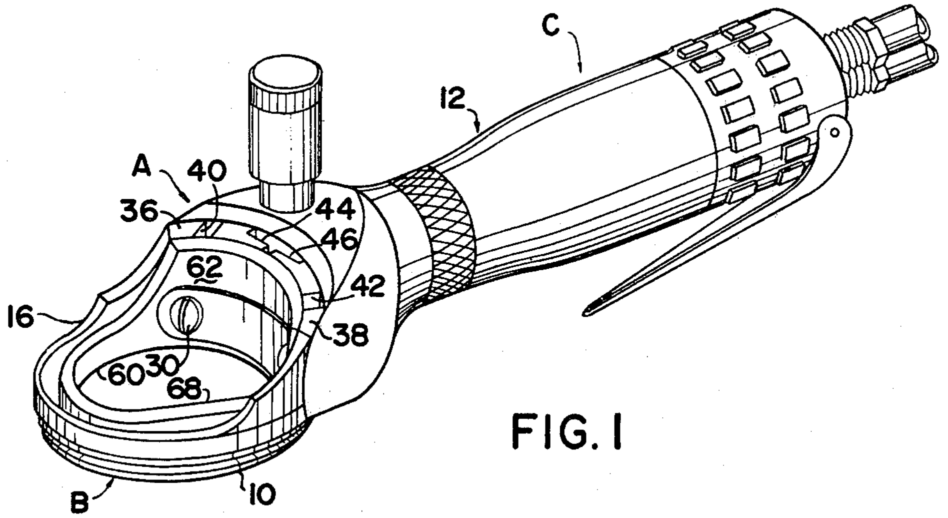
FIG. 1 is a perspective view of a knife embodying the invention.
Figure 4:
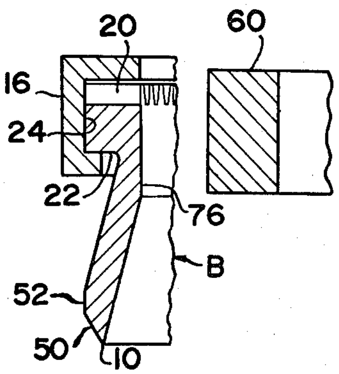
FIG. 4 is a sectional view approximately on the line 4—4 of FIG. 2.
Figure 3:
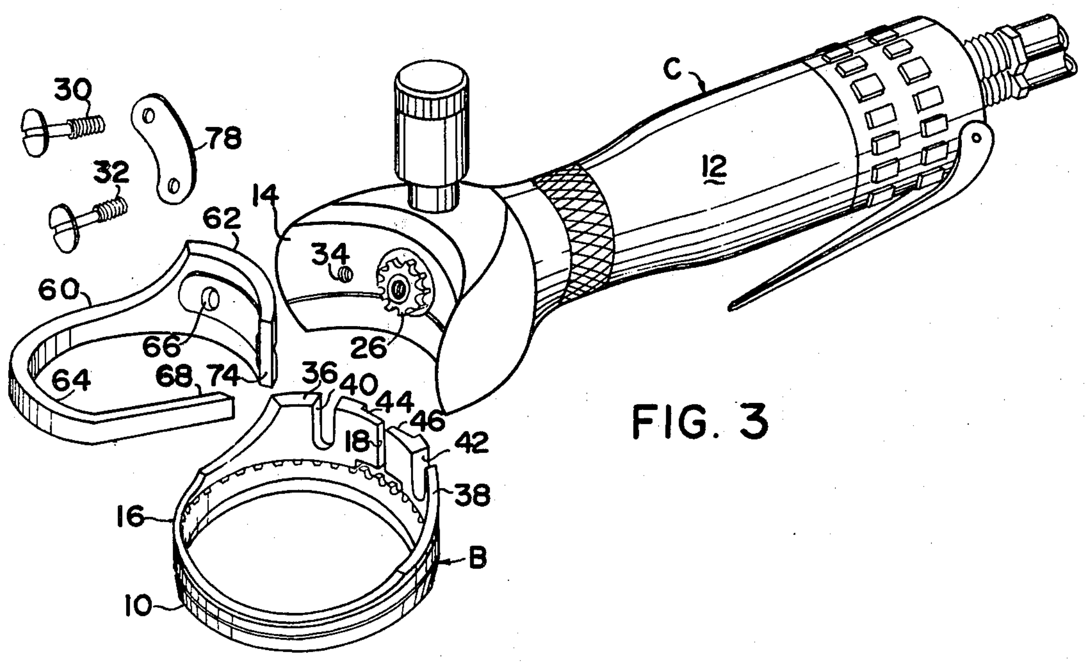
FIG. 3 is a perspective exploded view of the knife shown in FIG. 1.
Figure 5:
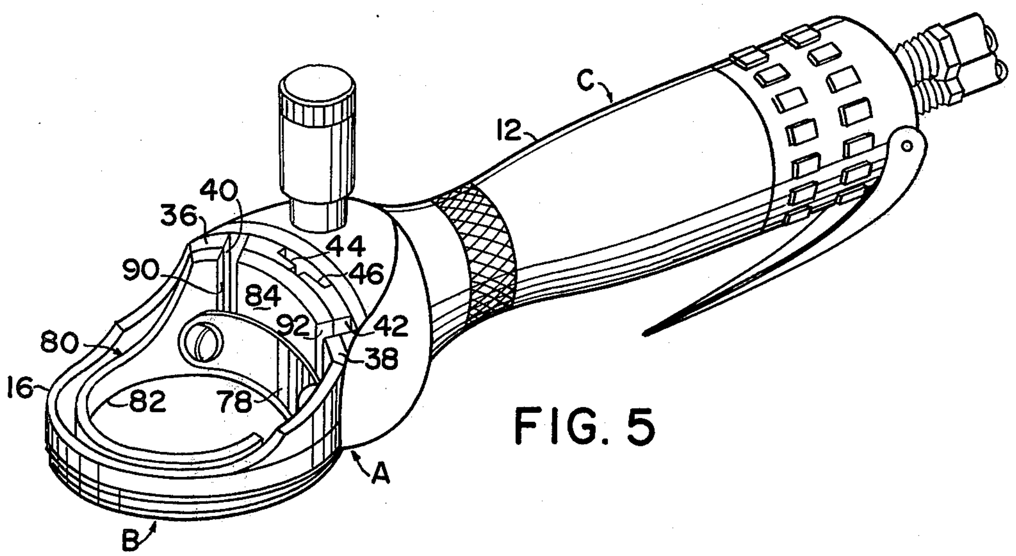
FIGS. 5, 6 and 7 are views similar to FIGS. 1, 2 and 3 but showing a knife of modified construction
Figure 6:
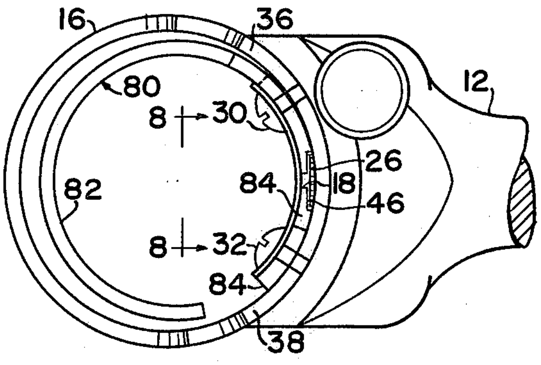
Figure 8:
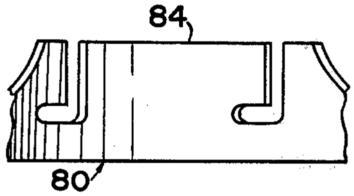
FIG. 8 is a fragmentary elevational view with parts omitted looking approximately from the line 8—8 of FIG. 6.
Figure 7:
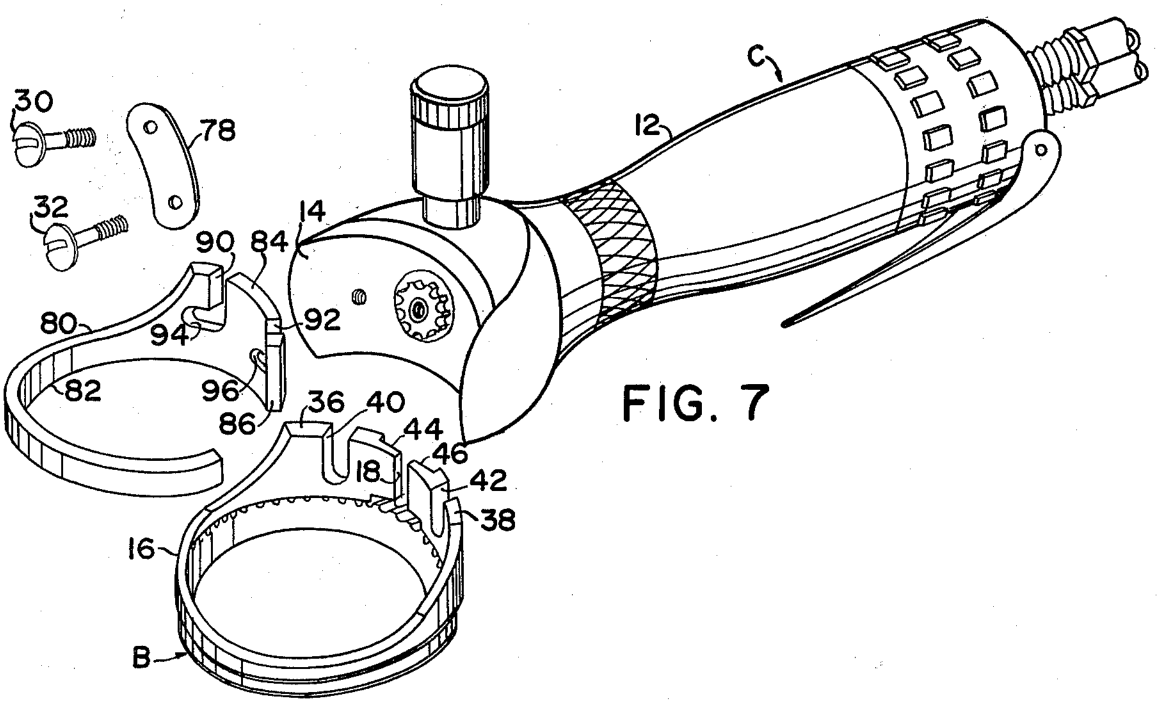

The knife shown in the drawings and designated generally by the reference character A comprises an annular ring-like blade B of relatively short axial length having a peripheral cutting edge 10 at one end and supported for rotation in a handle assembly C. The knife A is generally similar to that shown in FIGS. 1 and 4 of the aforementioned U.S. Pat. No. 3,852,882 and is typically referred to as "boning" knife, that is, one intended primarily for removing meat from bones. It is to be understood that the invention is equally applicable to other rotary bladed knives including "so-called" trimming and slicing knives such as shown in FIGS. 5 and 6 of U.S. Pat. No. 3,852,882. The handle assembly C comprises a tubular handle member 12 having a concave arcuate surface 14 at one end a split ring-shaped blade supporting member or housing 16, the split 18 of which is adjacent to the center of the arcuate surface 14 of the handle member 12. The ring-shaped blade B is of short axial length, is rotatably supported in the blade housing or supporting member 16 which surrounds the upper part of the blade with the cutting edge 10 of the blade extending from one end of the member 16. The other end of the blade B is provided with gear teeth 20. The blade B is rotatably supported in the blade housing 16 by an external flange 22 that engages in an internal groove 24 in the blade housing 16. The blade B is rotated by a gear 26 located at the arcuate surface 14 of the handle member 12 and in mesh with the gear teeth 20 on the blade B. The gear 26 may be rotatably supported in the handle member 12 and driven in any suitable manner, for example, in the same manner as the corresponding gear of the knife shown in FIGS. 1 to 4 of U.S. Pat. No. 3,852,882, the disclosure of which is incorporated herein by reference.

The blade supporting housing or member 16 and the blade B carried thereby are detachably connected to the handle member 12 by two headed and threaded fasteners 30, 32 at opposite sides of the split 18 in the member 16 which fasteners are threaded into suitably tapped apertures 34 opening into the arcuate surface 14 of the handle member. The member 16 is of short axial length being less than half that of the blade B and has portions or parts 36, 38 at opposite sides of the split 18 of greater axial length. The lengths of the parts 36, 38 are about twice that the remainder of the member 16 and extend in the direction away from the cutting edge of the blade.

The parts 36, 38 have slots 40, 42 opening into the ends thereof opposite to the end of the member 16 from which the cutting edge 10 of the blade B projects. The shanks of the fasteners 30, 32 for a short length immediately adjacent to the heads of the fasteners are reduced in diameter to the root diameter of the threads of the fasteners. The portions of the shank of the fasteners of reduced diameter adjacent to their heads extend through the slots 40, 42 in the member 16 at opposite sides of the split 18. Apertures 44, 46 in the ends of the member 16 at the split 18 provide clearance for the gear 26.

The construction of the member 16 and its manner of connection to the handle member 12 permits the member 16 and the blade B carried thereby to be removed from the handle assembly by merely loosening the fasteners 30, 32 and allowing the member 16 and blade B carried thereby to drop out of the handle assembly as the knife is viewed in the drawing. Once the assembled parts 16, B are removed from the other parts of the knife the blade B can be easily removed from the member 16 as by extending the member 16 which in the depicted knife is split. The blade can then be conveniently sharpened and replaced or replaced by a different sharp blade thus reducing the "down time" for the knife, that is, the time the knife is not usable. The most important advantage of the present knife is that it is not necessary to remove the fasteners 30, 32 from the handle assembly to replace a blade.

The major part of the blade B below the split ring member 16, in which it is carried, and in the depicted knife is approximately of uniform wall thickness and frusto-conical in shape, diverging outwardly towards its lower end as viewed in the drawings. The exterior part 50 of the lower end of the blade B at the cutting edge 10 diverges outwardly in an upwardly direction to a point where it intersects a substantially cylindrical exterior part 52. In resharpening the blade the exterior surface 50 adjacent the cutting edge 10 is ground away and the substantially cylindrical surface 52 adjacent thereto makes it possible to grind the blade without materially changing the configuration or area of the exterior blade surface adjacent the cutting edge thus making it possible to maintain a uniform blade cutting action throughout the life of the knife. The longer the part 52 is the more the blade can be sharpened and the life thereof thus extended.

Figure 2:
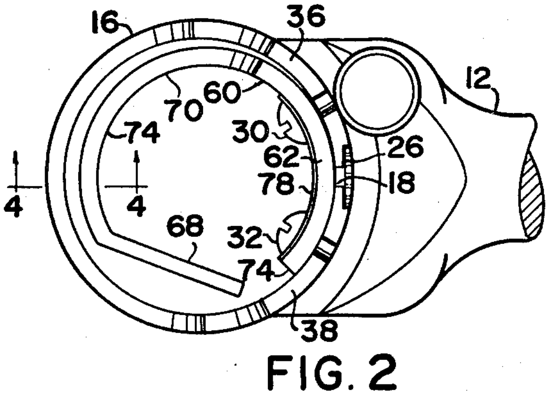
FIG. 2 is a fragmentary elevational view of the knife shown in FIG. 1.

The depicted knife is designed for use by a right-handed operator. The blade rotates in a counterclockwise direction as viewed in the drawings and when the knife is in use that part of the blade which is in the lower right-hand quadrant as the knife is viewed in FIG. 2, is the part which performs most of the cutting operation. A part being severed from a product being processed tends to fall away from the blade and with the blade rotating in a counterclockwise direction the part being severed tends to follow to counterclockwise movement of the blade thus reducing the efficiency of the cutting operation. In the depicted knife, this is prevented or reduced by the provision of a split ring-like product guide and interference member 60 in the interior of the blade of the knife which assists in guiding the part of the product being removed through the blade and also interferes with it being carried along with the circular movement of the blade. The general configuration of the member 60 is circular and has one end 62 of greater axial length than the remainder thereof 64 which is of shot axial length, being about 40% to 60% the axial length of the blade B. The end 62 of greater axial length of the member 60 is connected to the handle member 12 by the fasteners 30, 32 which extend through threaded apertures 66 in the end 62 of the member 60. The threads in the apertures 66 are the same as those in the apertures 34 in the part 12. The free end part 68 of the part 64 of the member 60 is preferably linear leaving a space or opening therebetween and the blade B for parts cut from the product to pass therethrough. The part 64 of short axial length of the member 60 is generally rectangular in cross-section and the part thereof between the parts 62, 68 is spaced inwardly of the blade B with the space therebetween and the blade B decreasing towards the attachment of the member 60 with the handle assembly 12. The cross-sectional widths of the members 16, 60 are about the same and about one third to one half the axial lengths of the portions thereof of short axial length and about one twenty-fifth of the blade diameter.

The end of the member 60 opposite the end of the part 68 terminates in a planar axial, radial surface 74 the radially outer edge of which lies closely adjacent to a cylindrical interior surface 76 of the blade B and prevents a part cut from a product being processed or being cut therefrom from following the counterclockwise rotation of the blade.

In the depicted knife a lock member 78 is provided underneath the heads of the fasteners to resist their unscrewing during use of the knife.

The knife $A^1$ depicted in FIGS. 5 to 8 of the drawings is similar to the knife depicted in FIGS. 1 to 4 of the drawings and will not be described in detail. The knives are alike except for the product guiding and interfering or restricting members and the parts of knife $A^1$ which are duplicates of those shown in FIGS. 1 to 4 are designated by the same reference characters.

The product guiding and restricting member of the knife $A^1$ is designated generally by the reference character 80 and like the part 60 of knife A has the general configuration of a split-ring member having a part 82 of short axial length and a part 84 of greater axial length, about twice the axial length of the part 82. The part 84 of member 80 abuts the concave cylindrical surface 14 of the handle member 12 and extends through an arc of about 90°. The remaining part 82 of the member 80 extends through an arc of about 250°. As distinguished from the parts 64, 68 of member 60 of knife A the part 82 of member 80 is arcuate throughout its length. A part of a product being processed cut from the product or being cut from the product by the knife $A^1$ is prevented from following around the interior of the knife with the blade B by a surface 86 on the end of the part 84 of the member 80 opposite to the end of the part 82 which end 84 is similar to the end 74 of the member 60.

The member 80 is provided with axial slots 90, 92 in the part 84 thereof for reception of the fasteners 30, 32 which detachably connect the member 80 along with the knife housing 16 to the handle assembly 12. The slots 90, 92 open into the end of the part 84 remote from the cutting edge of the blade B and the bottom ends thereof terminate in circumferential slots 94, 96 thus permitting the member 80 to be adjusted circumferentially within the knife blade B. The slots 94, 96 in the depicted knife $A^1$ extend only in the counterclockwise direction from the slots 90, 92 but they extend in either or both directions as desired. The slots 94, 96 allow the surface 84 of the member 80 to be moved closer or farther from the location or part of the knife that is typically pressed against the product being processed. As an alternative construction, the axial parts 90, 92 of the slots in the part 84 of the member 80 could be omitted and the parts 94, 96 of the slots combined with or formed into a single circumferentially extending slot opening into one end of the part 84 of the member 80.

The free ends of the product guiding and restricting members, that is, the ends not connected to the handle members, are spaced inwardly from the blades with which they are associated to provide space therebetween and the blades for the passage of parts being severed from a product being processed. Th optimum space is that which will maintain a short length at the part being severed adjacent to the product generally normal to the product thus increasing the efficiency of the cutting operation and preferably also causing the part being severed to contact the interfering surface at the other end of the member and not continue along with the circular rotation of the blade.

From the foregoing description of the preferred embodiments of the invention shown in the drawings and herein described it will be apparent that the objects hereinbefore enumerated and others have been accomplished and that there has been provided a novel and improved knife especially designed for the meat processing industry having a power driven, rotatable blade of short axial length supported in a ring-like housing member and a product interfering and guiding member both connected to a handle assembly by headed threaded fasteners in such a manner that the ring-like housing member and blade carried thereby and/or the product interfering and guiding member can be removed from the handle assembly for replacement of the blade without removing the fasteners. This is particularly advantageous because the knife is typically used in a location where it is wet and greasy thus making it inconvenient to remove and place fasteners which are necessarily relatively small in size.

While the preferred embodiment has been shown and described in considerable detail, it is to be understood that the invention is not limited to the construction shown, but that it may be otherwise embodied and it is the intention to hereby cover all such embodiments which come within the scope of the appended claims.

What is claimed is:

1. A hand knife suitable for use in the packing house and related industries comprising a handle assembly having a concave arcuate surface at one end with two tapped apertures opening thereinto, a drive gear adjacent to the arcuate surface of the handle assembly between the tapped apertures opening thereinto and rotatably supported in the handle assembly, a ring-like blade housing member of short axial length having portions of greater axial length at one end thereof having apertures therein, headed and threaded fasteners extending through the apertures in the housing member and threaded into the tapped aperture in the handle assembly detachably securing the housing member to the handle assembly, a ring-like blade member having an axial length about twice that of the housing member rotatably supported in the housing member and having a cutting edge at one end projecting from the housing member extending through an aperture therein and gear teeth at its opposite end in mesh with the drive gear, characterized by said knife having a split ring-like member within the blade thereof guiding the movement of a part of a product being severed from a product being processed in its movement through the blade connected to the handle assembly by the same fasteners which connect the housing member thereto and by the apertures in the housing member being slots opening into the end of the housing member opposite to the end from which the cutting edge of the blade projects, whereby the housing member and the blade carried thereby can be removed from the handle assembly without removing the fasteners connecting the housing member to the handle assembly.

2. A hand knife as claimed in claim 1 in which the product guiding member has a portion of greater axial length at one end thereof extending in the direction away from the end through which the blade projects with apertures therethrough through which the fasteners that connect it to the handle assembly extend and are slots opening into the end thereof opposite to the end through which the blade projects whereby the guiding member can be removed from the handle assembly along with the blade housing member of independently thereof.

3. A knife as claimed in claim 1 in which the apertures in the product guiding member has a circumferential slot in a portion of greater axial length extending in the direction away from the end through which the blade projects through which the fasteners extend and which slot opens into an end of the portion of greater axial length.

4. A knife as claimed in claims 1 or 2 in which the apertures in the product guiding member through which the fasteners extend are axial slots opening into the end of the member other than the end nearest to the cutting edge of the blade and the closed ends thereof are connected to circumferential slots whereby the member can be adjusted circumferentially within the housing member.

5. As an article of commerce, a split ring-like product guide member for use within the ring-like blade member of a knife having a ring-like blade housing member of short axial length detachably connected to a handle assembly by headed and threaded fasteners extending through apertures in the housing member and a ring-like blade member having an axial length about twice that of the housing member rotatably supported in the housing member with its cutting edge projecting from the housing member characterized by said split ring-like product guide member being of short axial length and having parts of increased axial length extending from one end thereof at one side of the split, axial extending slots in said parts of increased axial length opening into the extending end thereof for attachment to the handle assembly by the same fasteners which connect the housing member to the handle assembly whereby the product gauge member can be assembled with and removed from the handle assembly without removing the fasteners connecting the housing member to the handle assembly.

6. An article as claimed in claim 5 in which the closed end of the slots therein terminate in short circumferential slots.

* * * * *

UNITED STATES PATENT AND TRADEMARK OFFICE

CERTIFICATE OF CORRECTION

PATENT NO. : 4,178,683

DATED : December 18, 1979

INVENTOR(S) : LOUIS A. BETTCHER

It is certified that error appears in the above-identified patent and that said Letters Patent are hereby corrected as shown below:

Column 5, line 63 "extending through an aperture therein" should be removed.

Column 6, line 6 --extending through an aperture therein-- should be inserted after the word "thereto".

Signed and Sealed this

*Thirteenth* Day of *May 1980*

[SEAL]

*Attest:*

SIDNEY A. DIAMOND

*Attesting Officer* *Commissioner of Patents and Trademarks*